Nov. 1, 1955            H. C. GEAR            2,722,312
FARMER'S STOCK PEANUT PRE-CLEANER
Filed March 18, 1950            6 Sheets—Sheet 1
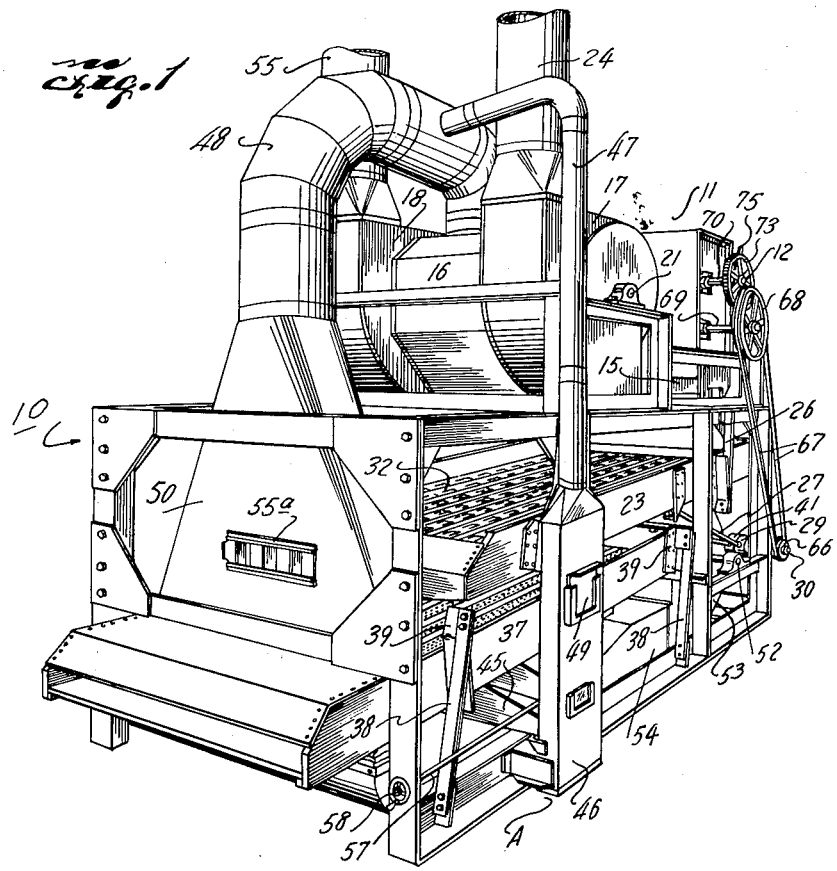
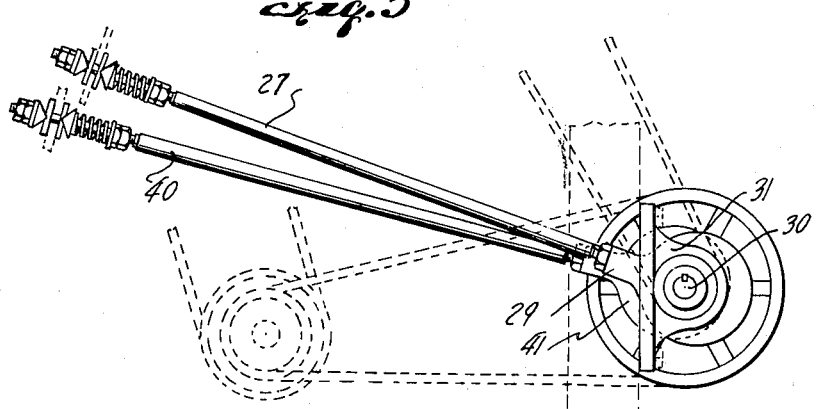
INVENTOR.
HARRY C. GEAR
ATTORNEY

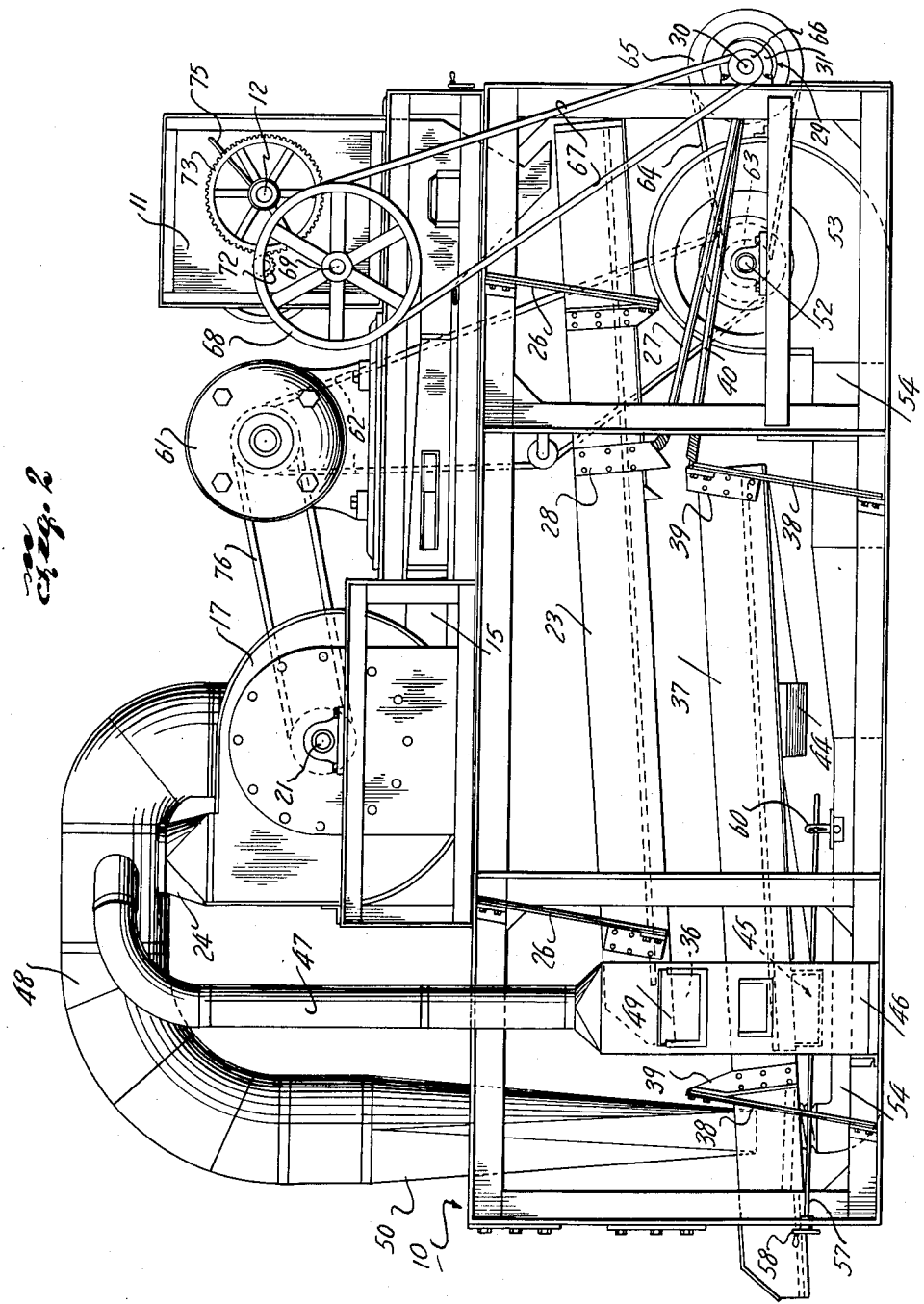

Nov. 1, 1955        H. C. GEAR        2,722,312
FARMER'S STOCK PEANUT PRE-CLEANER
Filed March 18, 1950        6 Sheets-Sheet 3
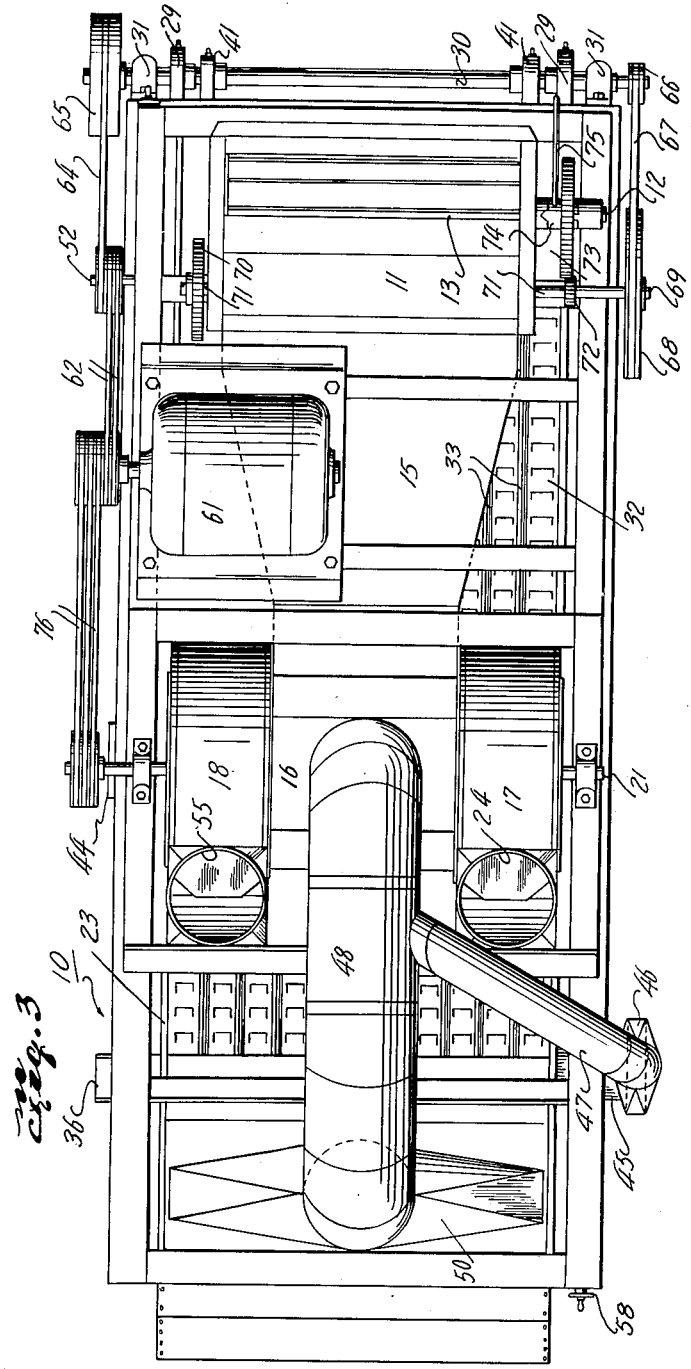
INVENTOR.
HARRY C. GEAR
BY
ATTORNEY Nov. 1, 1955 H. C. GEAR 2,722,312
FARMER'S STOCK PEANUT PRE-CLEANER
Filed March 18, 1950 6 Sheets-Sheet 4
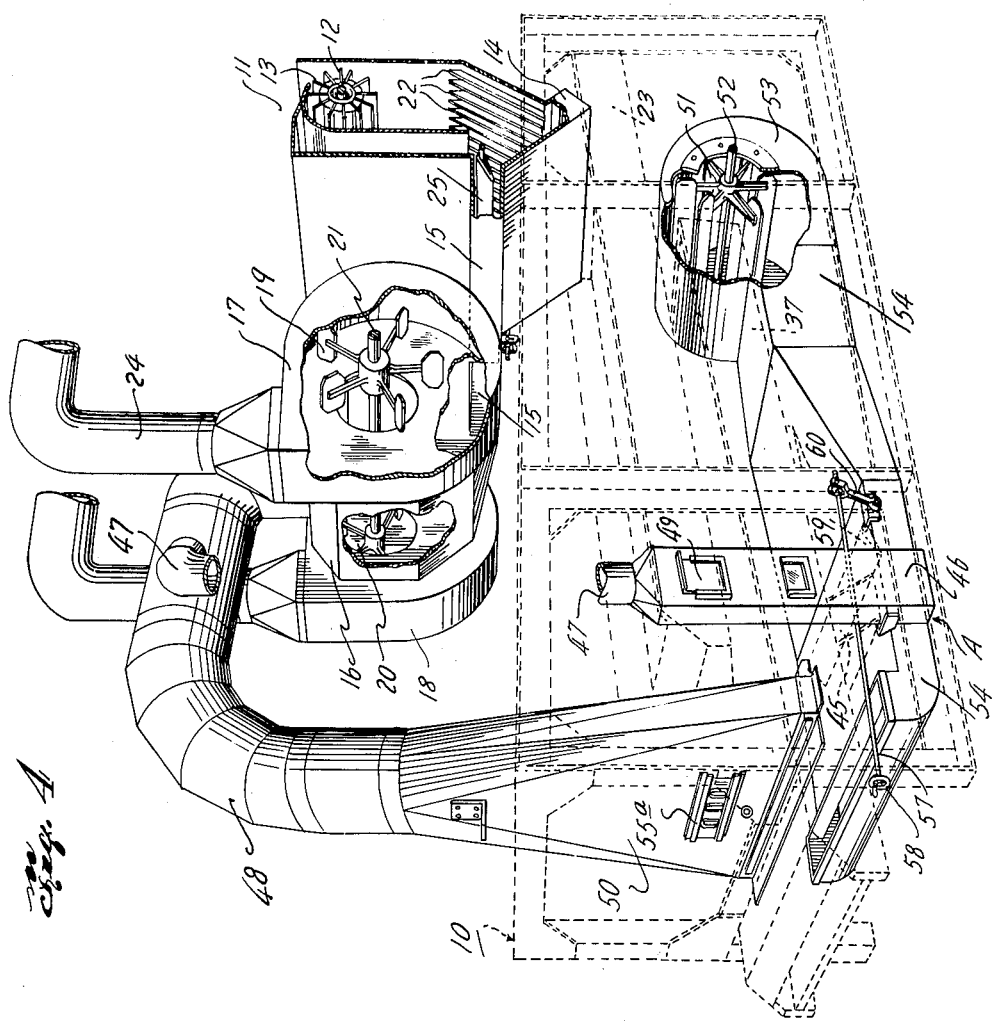
INVENTOR.
HARRY C. GEAR
ATTORNEY Nov. 1, 1955  H. C. GEAR  2,722,312
FARMER'S STOCK PEANUT PRE-CLEANER
Filed March 18, 1950  6 Sheets-Sheet 5
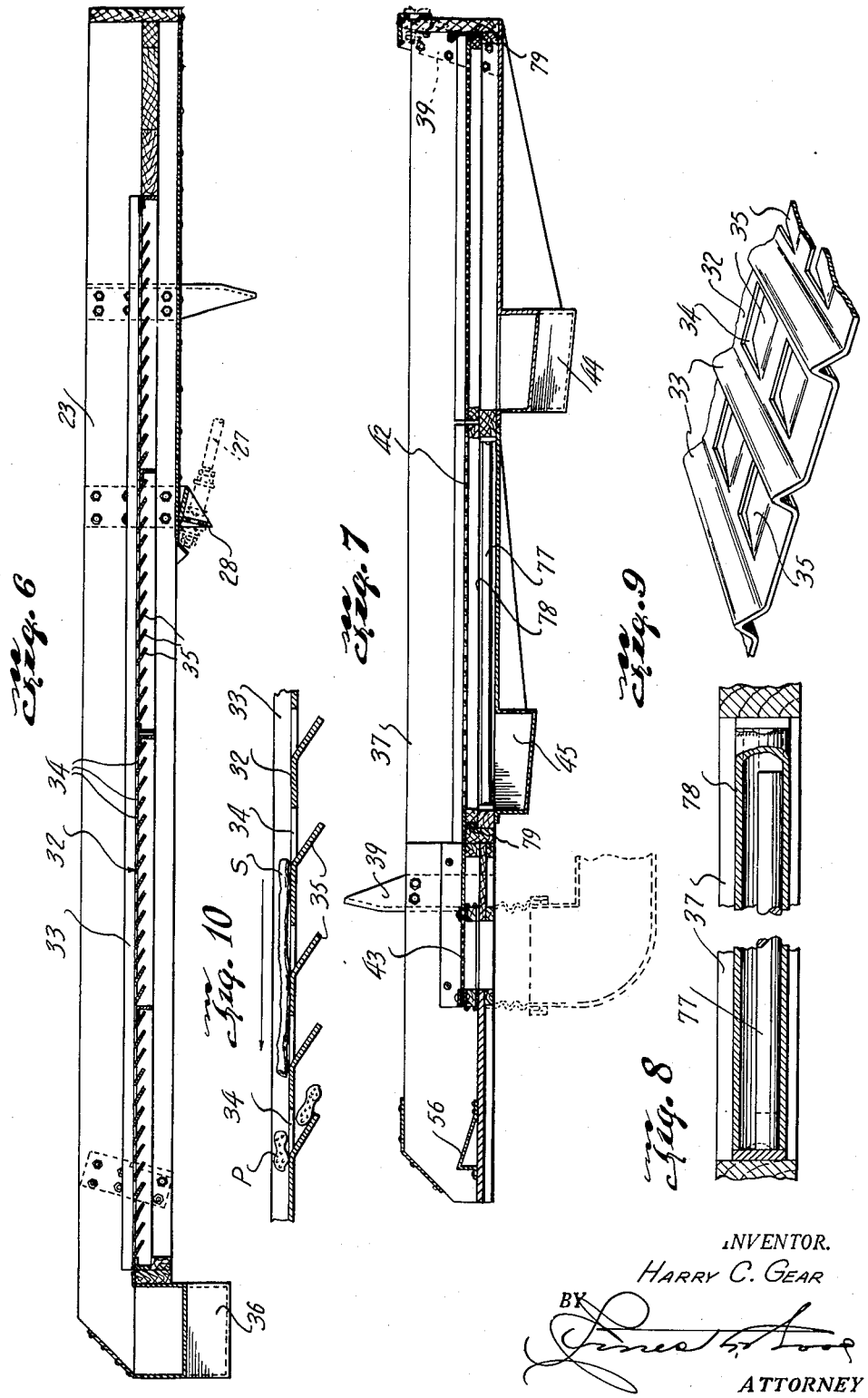
INVENTOR.
HARRY C. GEAR
BY
ATTORNEY Nov. 1, 1955 H. C. GEAR 2,722,312
FARMER'S STOCK PEANUT PRE-CLEANER
Filed March 18, 1950 6 Sheets-Sheet 6
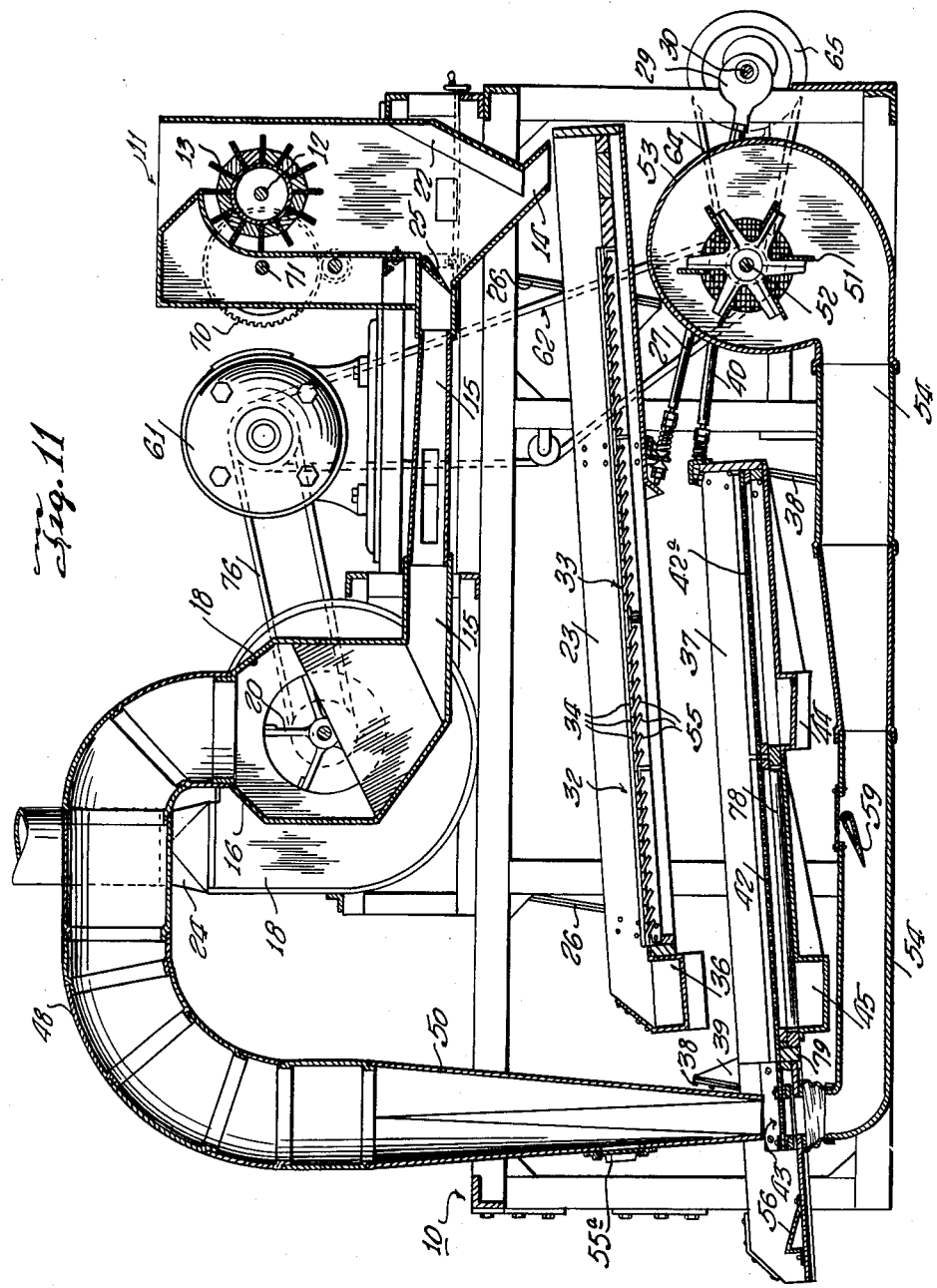
Harry C. Gear
INVENTOR.
BY
ATTORNEY

# United States Patent Office 2,722,312
Patented Nov. 1, 1955

2,722,312
FARMER'S STOCK PEANUT PRE-CLEANER

Harry C. Gear, Dallas, Tex., assignor to Sutton, Steele and Steele, Dallas, Tex.

Application March 18, 1950, Serial No. 150,526

2 Claims. (Cl. 209—19)

This invention relates to peanut precleaning machines and particularly to such a machine utilizing the principle of gravitation and aspiration in the separation of unshelled and split peanuts from debris.

The principal object of the invention is to combine in a single machine all of the features necessary for maintaining continuous, high volume and effective peanut precleaning, such precleaning to include separate removal from the mass of material moving through the machine of dust and small trash at the outset, the removal of large sticks, stones and sand by gravity separation; separate discharge of sticks and leafy material for stock feed; screening of shelled nut meats and finally, the stratification of the end product of the mass and aspirational removal of remaining trash as the cleaned whole peanuts emerge from the machine.

Another object of the invention is to provide each phase of the air system with an independent fan and control device whereby any necessary adjustment of one phase of the system will not affect the performance of other phases of the system.

Still another object of the invention is to provide certain novel improvements in the various instrumentalities responsible for the accomplishments of the machine, these including a ribbed or vaned feed aspirator for initial separation; a louvered scalping screen; a subjacent sand and shell stock screen and anti-blinding device therefor and a final "push-pull" aspirating assembly for the air-flotation, stratification and final separation of small trash from the peanut stock.

With the foregoing and other objects in view, the invention has further reference to certain features of accomplishment, to become manifest as the description proceeds, taken in connection with the accompanying drawings, wherein:

Figure 1 is a front perspective view of a peanut precleaner constructed according to the invention.

Figure 2 is a side elevational view.

Figure 3 is a top plan view.

Figure 4 is a perspective view showing in solid lines the air system of the machine, the remaining elements, including the frame being shown in dotted lines.

Figure 5 is a detail view of the operating means for the top and bottom screens.

Figure 6 is a view of the top screen in longitudinal section.

Figure 7 is a view of the bottom screen in longitudinal section showing the "anti-blinding" device installed therein.

Figure 8 is a detail view of the "anti-blinding" device in longitudinal section.

Figure 9 is a fragmentary perspective view of the peculiar deck structure of the top separating screen.

Figure 10 is a fragmentary sectional view of the top separating screen deck surface on a slightly larger scale, showing the relationship of sticks and peanuts thereon, and Figure 11 is a sectional view of the machine taken along a vertical plane lengthwise of the machine.

The peanut precleaning machine of the present invention employs the well known principle of gravity separation and screening, combined with pneumatic means for drawing off the lighter debris entrained with the mass of field stock but, unlike conventional machines for like purpose, the preferred stock, that is, the peanuts themselves are not diverted from their direct and continuous course through the machine. Only the sticks, leafy material and dust are affected by the aspirators, of which there are three, one at the feed end of the machine, a second for removing small peanut hulls and light trash in the course of travel of the material through the machine and the third at the discharge end thereof and these aspirators each has its individual fan and control means, thus to enable adjustment of one without interfering with the performance of the other. Moreover on accelerating the continuous cleaning action of the machine, the main screen thereof is equipped with a deck having relatively spaced, longitudinal ribs which lend rigidity to the deck surface, obviating whip or undue vertical vibration. Also, the deck is provided between the ribs with openings produced by thrusting the material of the deck downwardly at an angle to the plane of the deck, the relative spacing between the openings being an important factor in preventing the passing of sticks with peanuts through the openings.

Continuing with a more detailed description of the drawing, reference numeral 10 denotes generally the frame of the machine, supporting at its rear end a feed hopper 11 in which is mounted a transverse shaft 12 carrying a reel 13, adapted to control passage of material into the hopper. The lower portion of the hopper converges into an air chamber 14 (Fig. 4) with which communicates a duct 15, the latter, in turn, being connected to the common intake duct 16 of the two fan housings 17 and 18 containing fans 19 and 20 respectively, mounted on a common shaft 21. The duct 16 is divided into two separate compartments, as shown, to provide for independent adjustment of one phase of the aspirating system without affecting the efficiency of the other.

Within the throat of the hopper 11 is arranged, as shown in Figure 4, a series of relatively spaced ribs 22 onto which the bulk of material is discharged just as it comes from the field. These ribs are effective to allow the stock to flow uniformly downward onto the top vibrating shoe 23. Furthermore, the ribs 22, which may also be referred to as divider strips, serve as straightening vanes for combing the sticks forward into the air stream and to expose the bulk of the debris, such as sticks and leafy trash to the aspirating action of suction through duct 15 to be removed thereby and discharged through duct 24. Control of suction through duct 15 is accomplished through the valve 25 (Fig. 4) whose actuating lever is on the side of the machine opposite to that shown.

As the remaining stock is delivered to the top vibrating shoe 23, which is shown in detail in Figure 6, the slope, vibration and peculiar deck construction of this shoe are all factors combining to produce a scalping action effective to remove large sticks and similar trash remaining in the mass of material in transit through the machine. The shoe 23 consists of the main frame so numbered, which is suspended from the main frame 10 by means of resilient hangers 26. The frame 23 is vibrated at low frequency and high amplitude through the medium of a connecting rod 27, attached at one end in the manner shown in Figure 5 to a bracket 28 affixed to the shoe 23 and at its opposite end to an eccentric yoke 29, mounted on a transverse shaft 30 journaled in bearings 31 secured to the rear of the machine frame 10. A similar actuating mechanism is provided for the opposite side of the shoe 23.

The top shoe 23 employs a louver type screen 32 fabricated from sheet metal which has a plurality of longitudinal ribs 33 formed therein (Fig. 9). These ribs reduce the flexibility of the screen and prevent undue vertical whip or vibration and between each rib is a row of substantially square louver openings 34 which are produced by striking from the material of the deck tabs 35 and disposing these tabs at a predetermined obtuse angle in relation to the undersurface of the deck. The angle of the tabs 35 is important as is likewise the relative spacing of the holes 34, which is dependent upon the specie or size of peanut being processed.

The example given in Figure 10 will reveal the purpose of the deck construction. Peanuts P will readily pass through the openings 34 but sticks S, especially those whose length spans at least two openings, will be indexed by the ribs 33 and caused thereby to travel lengthwise down the louver surface to be scalped from the mass of material passing over the deck. The stick S shown in Figure 10 is revealed to be the minimum length of stick that will ride over the louver screen, those shorter in length may pass through the openings 34 to be later extracted in the manner to be presently explained.

The bulk of the peanuts deposited onto the louver screen 32 pass through the openings 34 while the scalped material, such as the larger sticks, continues to the end of the screen and is discharged through the spout 36 on the side of the machine opposite that shown in Figures 2 and 4 but revealed in Figure 3.

The material passing through the top screen 23 is received by the bottom shoe 37. This shoe consists of the frame, so numbered, which is sustained by resilient supports 38 on each side, the lower ends of the supports being attached to the machine frame 10 while their upper ends are affixed to brackets 39, secured to the sides of the shoe frame 37. Similarly to the top shoe, the lower shoe is vibrated at high amplitude and low frequency through the medium of a rod 40 (Fig. 5) connected at its upper end to the shoe frame 37 and at its opposite end to an eccentric yoke 41, the latter, in turn, being mounted on the shaft 30, previously mentioned.

The lower shoe 37 is fitted with three screens 42, 42a and 43. Screen 42 is employed for removing sand and attendant small trash which may pass through with the sand and this material is discharged from the screen 42 through the spout 44 on the opposite side of the machine. The peanut stock, including shelled and split peanuts with accompanying short sticks continue downward on the screen 42 and are discharged by way of a chute 45 into an aspirating chamber 46 disposed vertically against one side of the machine frame 10 adjacent the front thereof. A flue 47 effects communication between the upper end of the aspirator 46 and a larger flue 48, to be referred to again presently, and which is joined to the divided intake duct 16 of the fan assembly 17—18.

Small peanut hulls and light trash reporting with shelled stock at the spout 45 are removed by suction through the aspirator 46 and duct 47, the suction volume being controlled by a slide valve 49. The shelled peanuts, being heavier than the remaining lightweight trash overcomes the draft of air through the aspirator 46 and hence are collected, free from foreign matter below the aspirating chamber at A.

The lower end of the bottom shoe 37 is constructed as an air flotation section to serve as part of an effective "push-pull" aspirator removal assembly. A dust hood 50 is supported in the forward end of the machine frame with its mouth disposed immediately above the screen 43 of the lower shoe 37. The flue 48, previously referred to, connects the top of the hood 50 with the divided intake duct 16 of the fan assembly 17—18. Air required for the air flotation section is supplied by a blower 51 (Fig. 4), mounted on a shaft 52 in a housing 53 adjacent the rear end of the machine. This blower is operated independently of the dual fan assembly 17—18 for reasons heretofore made clear.

As peanuts and remaining small sticks and trash are conveyed by the bottom shoe 37 across the flotation section defined by the screen 43, air flowing through duct 54 from the blower 51 will pass through the screen to "push" upward against the sticks which are thus stratified above the mass of peanuts and brought into the influence of the up-draft of air in the hood 50, which "pulls" the sticks and like trash into the flue 48, from which the trash enters the divided suction duct 16, to be blown out through discharge 55, which, when connected to a discharge pipe constitutes a pneumatic conveying system. A controlled vent opening 55a in the hood 50 is provided, through which is governed the volume of air passing upwardly in the hood.

Whole peanuts, entirely free of debris, continue down the lower shoe 37 and are discharged at the end of the shoe over the dam 56 (Fig. 7), which latter retards the peanuts sufficiently to allow full effects of final aspiration in the manner explained.

Air passing through duct 54 from the blower 51 to the air flotation section is controlled through the medium of a rod 57, operated by a hand wheel 58 to actuate a valve 59 through a lever 60 (Fig. 4).

A single motor 61 operates all of the elements of the machine. By referring to Figure 2 particularly, it will be observed that a belt 62 transmits power from the motor shaft to the shaft 52 on which is mounted the blower 51. A pulley 63 (Fig. 2) is carried by shaft 52 and is engaged by a belt 64, the latter passing around a pulley 65 mounted on the main shaft 30 at the rear of the machine. The pulley 65 serves as a fly wheel as well as a driven pulley.

Mounted on the opposite end of the main shaft 30 is a small pulley 66, engaged by a belt 67 which passes around a larger pulley 68, mounted on a jack shaft 69. To accomplish necessary speed reduction in operating the feed roll 13 in the hopper 11, the shaft 69 passes alongside the hopper to its opposite side and carries a pinion which is concealed in Figure 3 by large gear 70 mounted on the end of a shaft 71. The gear 70 and shaft 71 are driven through the concealed pinion, to rotate pinion 72 carried by the opposite end of jack shaft 69 and which meshes with large gear 73 to drive the feed roll shaft 12 at a slow rate of speed. A clutch 74 and clutch operating lever 75 are provided for engaging and disengaging the feeder roll 13 with respect to the driving assembly. Belts 76 transmit power to drive the shaft 21 of the fan assembly from the motor pulley, as shown in each of the Figures 2 and 3.

Reference is again made to the lower shoe 37 and to Figure 8 of the drawing to explain a feature of importance with respect to the shoe. It has been found that separator screens of the type employed in the shoe have a tendency to become clogged with finely divided material passing thereover and which sometimes affects the general efficiency of the machine. To obviate this objectionable characteristic, a knocker bar 77 is confined within an elongated sleeve 78 of greater length than the bar and the sleeve, in turn, is fixed longitudinally in the center section of the shoe frame 37. As the shoe 37 is reciprocated, the rod 77 is brought up against the closed ends of the sleeve alternately to thus impose successive shocks which are distributed throughout the screen frames, but the shocks are absorbed by rubber pads 79 interposed between the ends of the screen frames and the frame of the shoe in which they are arranged, hence the shoe itself is not subjected to the shocks. The shocks or vibrations imposed by the rod 77 have been found to loosen material compacted in the openings of the screens 42 and 43 of the shoe or to prevent accumulation of material therein, leaving the openings free to the passage of material therethrough. This feature is referred to herein as the "anti-blinding" device.

In operation, the peanuts from the field mixed with sticks, trash and other foreign material are loaded into the hopper 11, the reel 13 rotating at a constant speed insuring that the peanuts are fed at a uniform rate to the set of spaced ribs 22 in the throat of the hopper. The ribs 22 comb or align the sticks and other trash and expose them to the air stream flowing up the air chamber 14 and into the duct 15. A large proportion of the sticks and trash is carried by this air stream, whose strength is controlled by the valve 25, into the duct 15 and thence to the discharge duct 24.

The partly cleansed peanuts then fall through the chamber 14 to the screen 32 of the frame 23 which is continuously vibrated by the connecting rod 27. The peanuts and trash tend to move down the screen 32 toward the spout 36 but the peanuts and small sized trash fall through the louver openings 34 to the upper section 42a of the screen 42 of the lower shoe 37 which is also in a state of vibration. The larger sticks straddle the louver openings and pass down the screen 32 to the spout 36, the ribs 33 of the screen causing the sticks to align themselves longitudinally with the screens thus facilitating the passage of the sticks to the spout 36 while allowing the peanuts and smaller sized trash to fall to the upper section 42a of the screen 42.

The upper section 42a of the screen 42 has very small openings, see Figure 7, through which sand and other small particles of trash descend to the spout 44 which carries them outside the machine. The remainder of the peanuts and trash moves down to the lower section of the screen 42 which has larger openings than the upper section. Shelled and split peanuts as well as short sticks and other trash fall through these larger openings and are carried by the chute 45 into the aspirating chamber 46. The short sticks and other light trash are carried upward by the air stream through the flue 47 to be discharged through the discharge duct 24. The relatively heavier shelled and split peanuts fall down through the aspirator 46 and are collected, free from foreign matter, below the aspirating chamber at A, Figure 1.

The whole peanuts, from which shelled peanuts, sand and other trash have been separated, descends down the screen 42 to the screen 43. The remaining trash mixed with the peanuts is forced up through the whole peanuts by the blast of air blown by the blower 51 through the screen 43. This action of the blast of air stratifies the mixture of peanuts and trash, the trash being moved upward to form a layer or stratum on top of a layer or stratum of peanuts. This upper layer of trash is subjected to the suction or air stream of the air pulled upwardly through the hood 50 and is carried thereby into the flue 48 and thence to the discharge 55. The lower stratum of peanuts, from which all trash has now been separated, moves down off the screen 43 and eventually over the dam 56 to lie collected in a bag or other receptacle. The dam 56 retards the movement of the peanuts off the screen 43 so that peanuts are subjected to the full aspirating effect of the air stream pulled up the hood 50.

It will be evident now that the peanut pre-cleaning machine removes a portion of the trash mixed with peanuts loaded into the hopper 11 by carrying such trash, aligned by the ribs 22, through the duct 15 and thence out of the machine, that it separates large sticks from the peanuts and discharges such large sticks through the spout 36, that it separates sand from the peanuts and discharges the sand through the spout 44, that it separates shelled and split peanuts from the whole peanuts and discharges such shelled and split peanuts along with accompanying small trash through a chute 45 into an aspirator 46 in which the trash is separated from the shelled peanuts and the shelled peanuts are discharged at a collection point, that the whole peanuts and remaining trash are separated into lower and upper strata by the air driven by the blower 51, and that the upper stratum of trash is carried upward through the hood 50 allowing only the whole peanuts, now free from all trash, to pass down over the dam 56 and be collected therebeyond.

Manifestly, the construction as shown and described is capable of some modification and such modification as may be construed to fall within the scope and meaning of the appended claims is also considered to be within the spirit and intent of the invention.

What is claimed is:

1. In apparatus of the type described, the combination comprising an inclined reciprocably mounted shoe having three screens on the same inclined plane, the uppermost and intermediate screens having openings of different sizes, said shoe being adapted to receive a mixture of peanuts and trash which is moved downwardly over said screens successively as said shoe is reciprocated to separate the material moving over said screens according to difference in specific gravity, a dam disposed at the lower end of said shoe to retard progress of the material thereon; a blower having an air discharge directed upwardly through the lowermost of said screens to cause the mixture of peanuts and trash to separate into two strata, the peanuts forming a lower stratum and the trash forming an upper stratum; and an aspirator having an intake disposed above said screen in vertical alignment with the air discharge of said blower for removing the upper stratum of trash from the lower stratum of peanuts, the lower stratum of cleaned peanuts discharging from the lower end of the shoe, a tubular sleeve fixedly disposed longitudinally in a portion of said shoe and containing a rod capable of endwise displacement in the sleeve and adapted to collide alternately with the closed ends of the latter as the shoe is reciprocated to impose successive shocks thereon effective to dislodge material clogging the perforations of the screens of said shoe.

2. In an apparatus of the character described for cleaning a mixture of peanuts and trash, the combination comprising a reciprocably mounted elongate inclined shoe, said shoe having longitudinally aligned first, second and third screens on the same inclined plane, the first screen on the upper end of said shoe having smaller perforations than the second screen, the second screen having perforations large enough to allow shelled peanuts to fall therethrough; means disposed beneath said first screen for receiving and discharging sand and fine trash falling through said first screen; a dam disposed adjacent the lower discharge end of said shoe for retarding discharge of material therefrom, a first aspirator; means beneath said second screen for receiving shelled peanuts and trash and discharging said shelled peanuts into said aspirator, said aspirator separating the trash from said shelled peanuts, said shelled peanuts falling through the aspirator to a collection point; means for blowing air upwardly through the third and lowest screen to cause the mixture of whole peanuts and trash remaining on the shoe to separate into two strata, the peanuts forming a lower stratum and the trash forming an upper stratum resting on the lower stratum; and a second aspirator in vertical alignment with said first aspirator for pulling upward and removing the upper stratum of trash, the lower stratum of cleaned whole peanuts discharging from the lower end of said shoe, and means carried by said shoe and reciprocated thereby for imposing shocks effective to dislodge material compacted in the openings in said screens.

References Cited in the file of this patent

UNITED STATES PATENTS

| 108,154 | Kibler | Oct. 11, 1870 |
| 139,843 | Wilson | June 10, 1873 |
| 532,947 | Closz | Jan. 22, 1895 |
| 726,319 | Mann | Apr. 28, 1903 |
| 783,571 | Fricke | Feb. 28, 1905 |
| 987,460 | Heldman | Mar. 21, 1911 |
| 1,083,150 | Steere | Dec. 30, 1913 |
| 1,321,510 | Dodds | Nov. 11, 1919 |
| 1,781,790 | McKenzie | Nov. 18, 1930 |
| 1,799,010 | Farris | Mar. 31, 1931 |
| 1,880,684 | Berry | Oct. 4, 1932 |
| 1,928,216 | Apel | Sept. 26, 1933 |
| 1,973,836 | Woodhead | Sept. 18, 1934 |
| 2,429,343 | Carter | Oct. 21, 1947 |
| 2,449,007 | Paul | Sept. 7, 1948 |
| 2,548,142 | Carter | Apr. 10, 1951 |

FOREIGN PATENTS

| 726,319 | Great Britain | Apr. 28, 1903 |